July 16, 1957 W. T. GREENWAY 2,799,516
LONGITUDINALLY ADJUSTABLE FIFTH WHEEL MOUNTING
FOR TRAILER TRUCKS
Filed June 24, 1955 3 Sheets-Sheet 1
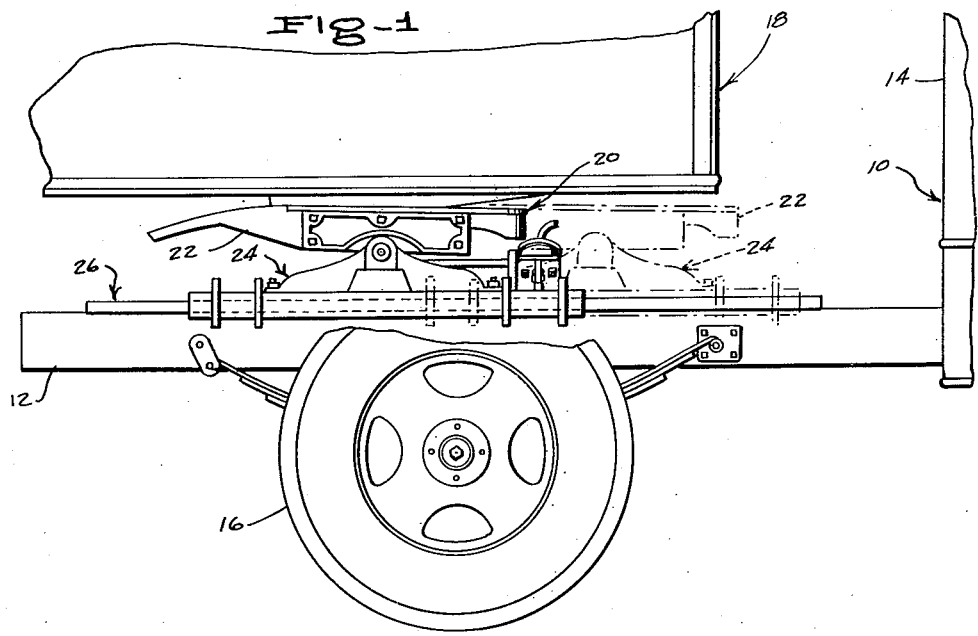
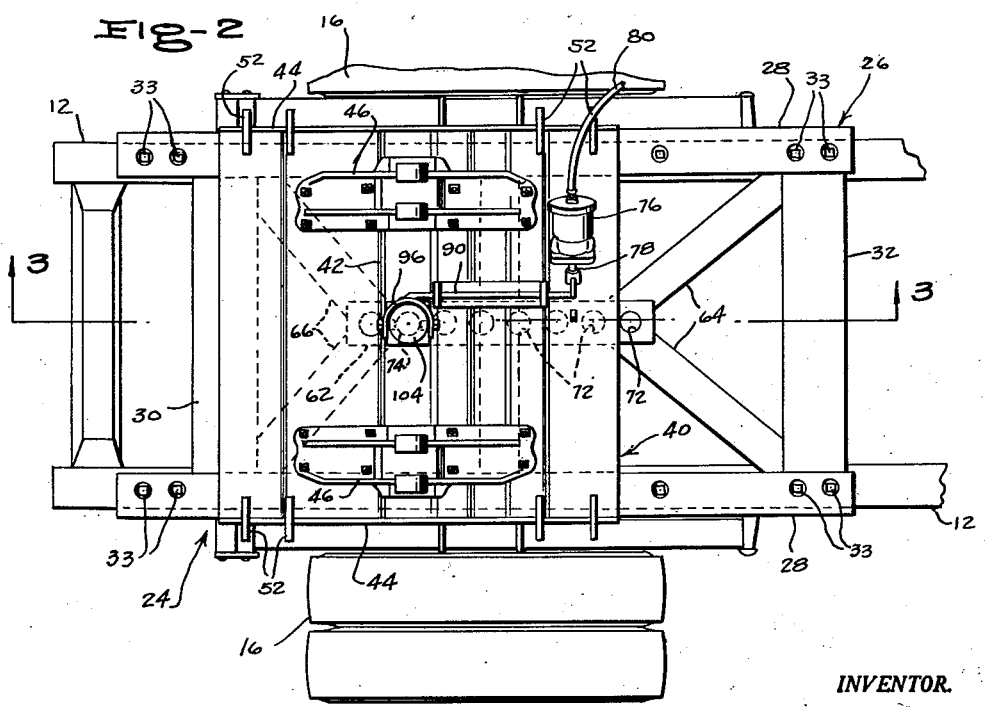
INVENTOR.
WILLIAM T. GREENWAY
BY
McMorrow, Berman & Davidson
ATTORNEYS July 16, 1957 W. T. GREENWAY 2,799,516
LONGITUDINALLY ADJUSTABLE FIFTH WHEEL MOUNTING
FOR TRAILER TRUCKS
Filed June 24, 1955 3 Sheets-Sheet 2
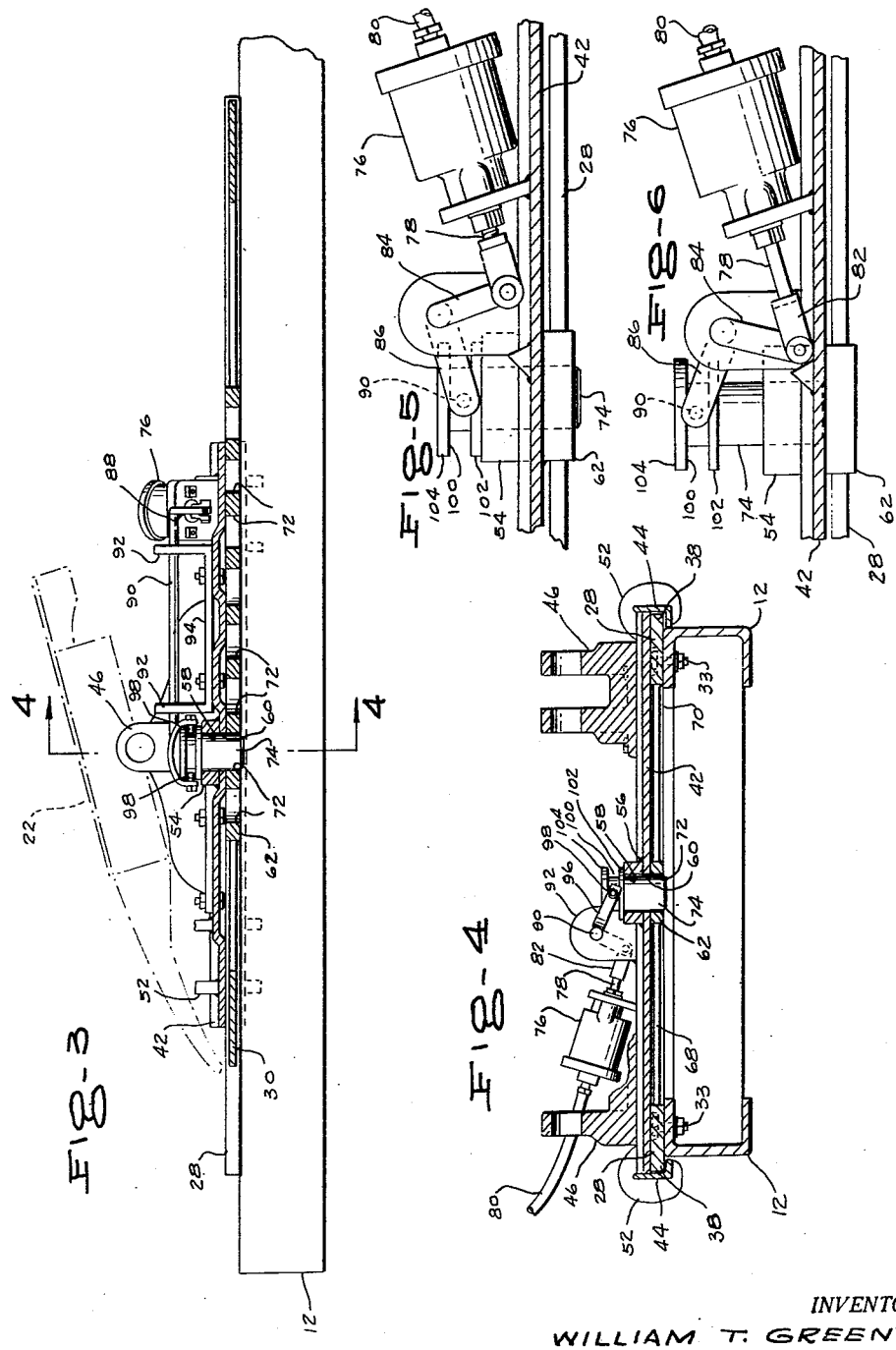
INVENTOR.
WILLIAM T. GREENWAY
BY
McMorrow, Berman & Davidson
ATTORNEYS

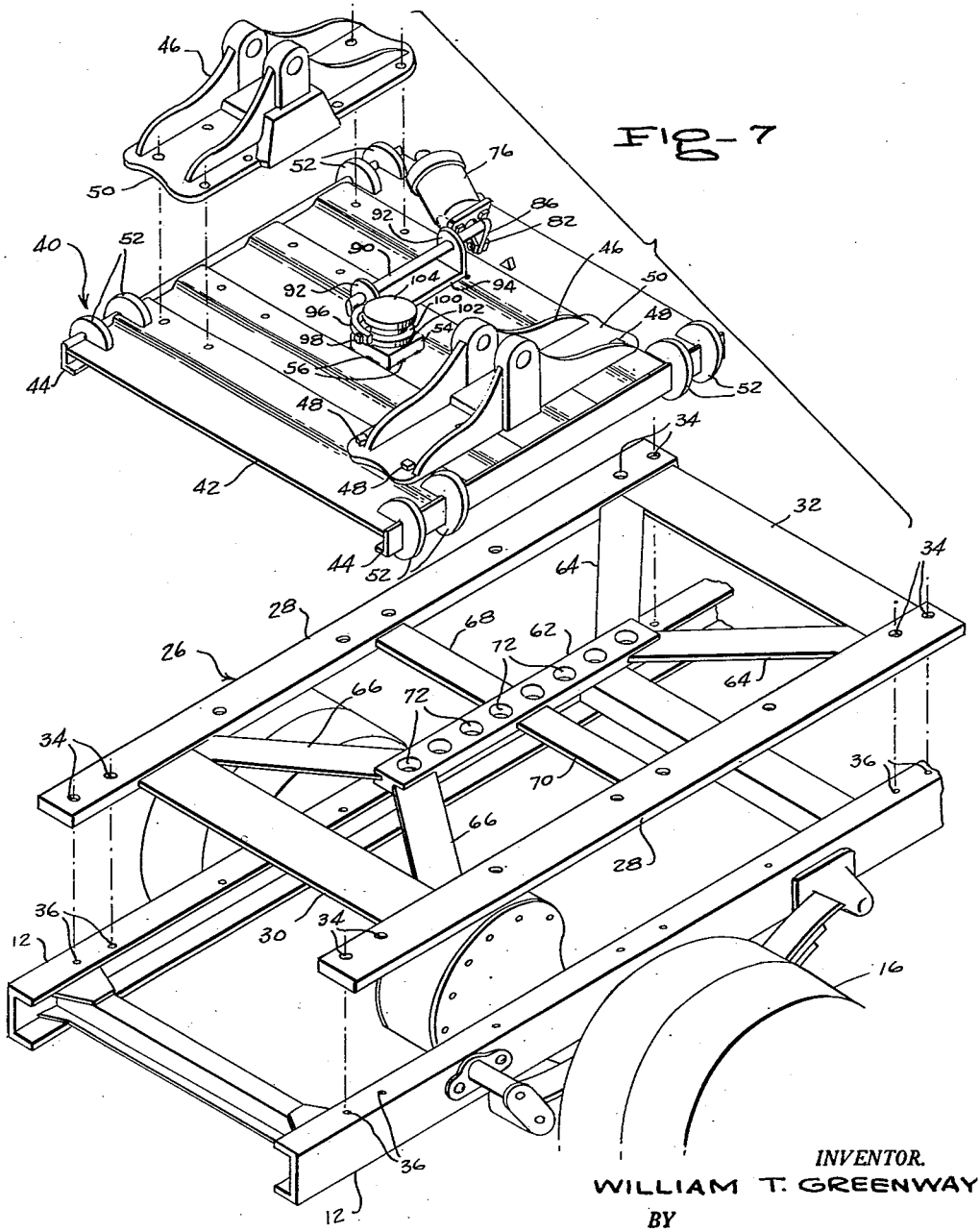

United States Patent Office 2,799,516
Patented July 16, 1957

2,799,516

LONGITUDINALLY ADJUSTABLE FIFTH WHEEL MOUNTING FOR TRAILER TRUCKS

William T. Greenway, Borger, Tex.

Application June 24, 1955, Serial No. 517,765

4 Claims. (Cl. 280—407)

This invention relates to fifth wheel couplings for trailer trucks, and more particularly to a mounting for a fifth wheel.

It is the principal object of this invention to provide a fifth wheel mounting for trailer trucks to which a trailer may be detachably connected, the fifth wheel mounting being selectively fixed at a desired position longitudinally of the frame so that the overall length of the semi-trailer unit may be predetermined, and to have the mounting selectively movable by the truck operator so that the overall length of the prime mover or trailer truck plus the trailer can be selectively shortened or lengthened.

Another important object of this invention is to provide a mounting for the fifth wheel of a trailer truck, which mounting is fashioned to have a universal application to the trailer truck, and on which it may be mounted with a minimum of structural change necessary in the trailer truck, and may be applied to the trailer truck of any make or model without change in the structure of the mounting.

Yet another object of this invention is to provide a simple, yet rugged fifth wheel mounting which may be readily incorporated into all existing trailer truck structures at nominal cost and with a minimum of work time, so as to provide selective adjustment of the overall length of the truck trailer plus its detachably secured trailer unit, and which mounting may be selectively operated by the operator from the interior of the cab of the trailer truck.

Other objects and advantages will become apparent from a consideration of the following detailed description, forming the specification, and taken in conjunction with the accompanying drawings, in which:

Figure 1 is a fragmentary side elevational view of the rear portion of a trailer truck showing the fifth wheel mounting embodying this invention, and a trailer attached to the fifth wheel supported upon the mounting;

Figure 2 is a top plan view of the fifth wheel mounting as applied to the frame of the trailer truck with the fifth wheel removed therefrom;

Figure 3 is a cross-sectional view taken substantially along line 3—3 of Figure 2, and looking in the direction of the arrows;

Figure 4 is a vertical, transverse cross-sectional view taken substantially along line 4—4 of Figure 3, and looking in the direction of the arrows;

Figure 5 is a view in side elevation of the locking element and means for moving same, with the locking element in its engaged position, with portions of the other elements of the mounting shown fragmentarily;

Figure 6 is a view similar to Figure 5, but showing the locking element moved out of engaging relation with lock element receiving means on the support frame of the fifth wheel mounting; and Figure 7 is an exploded perspective view of the fifth wheel mounting and the rear portion of the truck trailer frame upon which the mounting is carried.

With continued reference to the drawings, there is shown the rear portion of a trailer truck, generally indicated at 10, provided with the usual longitudinally extending, horizontally disposed truck side frame including spaced frame members 12, and extending rearwardly from the cab 14 over the rear axle and rear wheels 16 rotatably carried on the axle in the usual manner. The trailer, generally indicated at 18, is shown in Figure 1 as being detachably secured to the trailer truck 10 through a fifth wheel connection, generally indicated at 20. The fifth wheel 22, of the fifth wheel connection 20, is supported on the fifth wheel mounting, generally indicated at 24, embodying this invention.

The fifth wheel mounting 24 comprises a generally rectangular support frame, generally indicated at 26, and having spaced parallel side members 28, rigidly secured in their spaced relation by transversely extending, parallel cross pieces 30 and 32 extending therebetween adjacent opposite ends thereof. The cross pieces 30 and 32 are of a lesser thickness than the generally rectangular, elongated side members 28, and extend between the side members intermediate the width thereof so that the upper and lower surfaces of the side members are coplanar with no parts projecting thereabove or therebelow.

The support frame 26 is adapted to be slidably superimposed upon the rear portion of the truck frame so as to overlie the frame members 12. The support frame 26 is then moved longitudinally of the truck frame to the desired location and fixedly secured when in the selected position by a plurality of bolts 33 passing through registering openings in the side members 28 of frame members 12. With regard to these registering openings, it will be apparent that once the support frame 26 has been placed in a selected position longitudinally of the truck frame, the necessary openings, such as the openings 34 can be drilled in the side members 28 and also openings 36 drilled into the upper flange of the frame members 12 so as to be in register with the openings 34 to receive the bolts 33, as shown in Figure 2.

As best shown in Figure 4, after the support frame 26 has been bolted in a selected position longitudinally of the truck frame upon the truck frame members 12, a portion 38 of the side members 28 overhangs the respective frame members 12 and extends longitudinally thereof to define a guide rail, the purpose of which will presently appear.

A carriage, generally indicated at 40, is operatively connected to the support frame 26 for longitudinal back and forth sliding movement thereon. The carriage 40 comprises a generally rectangular, ribbed plate 42 with an angle iron 44 secured along an upstanding flange at opposite longitudinal edges of the plate and depending therefrom with the other flange of the angle irons 44 disposed in opposed relation to each other and extending longitudinally of the plate in spaced parallel relation therebelow. Thus, the angle irons 44 defines slide guides receiving the trackway portions 38 of the slide members 28 therein and afford means whereby the carriage 40 may be slidably moved longitudinally of the support frame 26, as clearly shown in Figure 4.

A pair of identical bearing saddles 46 are mounted on the plate 42 of the carriage in spaced relation, longitudinally thereof adjacent the opposite longitudinal edges thereof along which the angle irons 44 are secured, and the saddles may be fixedly secured to the plate by means of bolts 48 passing through registering openings in the plate base 50 of the saddles and the plate 42 of the carriage. The fifth wheel 22 is mounted in the saddles 46 of the carriage 40 for movement therewith.

It will be noted that spaced pairs of gussets 52 are provided on each of the angle irons 44 to reinforce these angle irons adjacent opposite ends thereof and rigidify the angle irons by making a positive connection between the angle irons 44 and the plate 42 of the carriage, as clearly shown in Figures 4 and 7.

Centrally disposed on the upper surface of the plate 42 is a generally square boss 54. The boss 54 may be secured as by being welded to the upper surface of the plate along its lower peripheral edges, as at 56. A central bore 58, defining a locking element receiving means, is provided centrally transversely through the boss 54 and registers with a hole of similar diameter, as at 60 transversely through the plate 42 which also forms a part of the locking element receiving means on the carriage 40. A generally rectangular, elongated latch or lock bar 62 is carried by the support frame 26 intermediate the side members 28 and between the cross pieces 30 and 32, as shown in Figure 7, so as to extend longitudinally of the support frame medially thereof. The latch or lock bar 62 is rigidly supported in position by pairs of diverging support arms 64 and 66 extending angularly outwardly from opposite ends of the bar 62 and secured at their other ends at the intersection of the cross pieces 30 and 32 with the respective side members 28. A reinforcing cross piece 68 is secured at opposite ends to the inner surface of the side member 28 and extends toward the bar 28 intermediate its ends to be secured to the adjacent longitudinal side thereof while a transversely aligned, similar reinforcing member 70 extends from the opposite longitudinal side of the bar 62 toward the adjacent inner longitudinal edge of the other side member 28. Thus, the bar 62 is fixed in position and defines a fixed lock bar latch element.

A plurality of equally spaced openings 72 are drilled transversely through the bar 62 and arranged in longitudinally spaced relation along the longitudinal center line of the bar, as clearly seen in Figure 7. The openings 72 define locking element receiving means selectively registerable with the locking element receiving means on the carriage defined by the registering bore 58 and hole 60.

A locking element 74, in the form of a pin, is mounted on the carriage 40 for movement in the vertical rectilinear path through the locking element receiving means thereon so that as the carriage is moved longitudinally of the support frame, the locking element receiving means on the carriage will be selectively registrable with any one of the plurality of complemental locking element receiving means 72 on the support frame 26. The locking element 74 can then be moved in its rectilinear path downwardly through the locking element receiving means on the carriage and into engagement with the selected one of the locking element receiving means on the support frame so as to secure the carriage in a selected position longitudinally of the support frame and of the truck frame.

Thus, by moving the locking element 74 in its rectilinear path from the position shown in Figure 6 to the position shown in Figure 5, the carriage can be secured in a selected position longitudinally of the truck frame so as to selectively lengthen or shorten the overall length of the tractor-trailer unit. The extent of this adjustment is limited only by the length of the bar 62.

It will be appreciated that in order to move the carriage longitudinally of the support frame, it will be assumed that the trailer 18 is connected to the fifth wheel 22 through the fifth wheel connection 20, and the locking element or pin 74 is in the position shown in Figure 6. The truck operator can then move the truck or prime mover forward or backward so as to impart sliding movement back and forth of the carriage along the support frame to the selected position, at which time the locking element will be moved into engagement with the selected one of the locking element receiving means or openings 72.

The movement of the locking element or pin 74 in its rectilinear path is positively accomplished by the operator of the cab of the vehicle through hydraulic means operatively connected to the locking element or pin. This means includes a hydraulic cylinder 76 mounted on the carriage 40 so as to move the piston rod 78 inwardly and outwardly from one end of the cylinder 76 remote from the end thereof to which the source of hydraulic pressure enters through the usual flexible tube 80 with the flow of fluid through the tube 80 controlled in the usual manner from the cab of the prime mover or truck.

An extension piece 82 is threadedly secured to the free end of the piston rod 78 and extends longitudinally therefrom. Adjacent the free end of the extension piece 82 there is pivotally connected thereto one end of a link 84, the other end of the link 84 being pivotally secured to one end of a shaft operating lever 86 and the lever 86 is fixedly secured adjacent its other end to one end 88 of an operating shaft or rod 90 rotatably supported intermediate its ends in the spaced parallel arms 92 upstanding from a base 94 bolted upon the upper surface of the carriage plate 42 at one side of the boss 54. The other end of the operating shaft or rod 90 is fixedly secured thereto a yoke 96 extending laterally therefrom and in surrounding relation to the upper end of the locking element 74 with pins 98 carried adjacent the opposite free ends of the yoke and extending toward each other to be received in a groove 100 formed between parallel flanges 102 and 104 carried by the upper end of the locking element or pin 74 and extending outwardly therefrom in concentric relation thereto.

Thus, as the hydraulic cylinder 76 is actuated, the piston rod 78 may be moved outwardly therefrom, as shown in Figure 6, to move the link 84 and impart movement to the shaft operating lever 86 whereby rotation is imparted to the operating shaft or rod 90 and this will result in a movement of the yoke 96 in a vertical arcuate path about the longitudinal axis of the operating shaft. By virtue of the pin connection between the yoke 96 and the upper end of the locking element or pin 74, the pin will be moved in its rectilinear path upwardly through the bore 58, hole 60 and the selected one of the openings 72, to the position shown in Figure 6 and the carriage will then be free to be moved slidably back and forth longitudinally of the support frame 26 and the overall length of the tractor-trailer unit adjusted to prevailing requirements. As the carriage is moved, the locking element receiving means on the carriage will be selectively registrable with any one of the plurality of complemental locking element receiving means 72 formed on the support frame in response to such movement of the carriage, and the truck operator may then actuate the hydraulic cylinder 76 to have the piston rod 78 move toward the cylinder 76 to the position, as shown in Figure 5, causing movement of the yoke 96 in its vertical arcuate path to positively move the locking element or pin 74 in its rectilinear path into engagement with the locking element receiving means 72 which has been placed in selective register with the locking element receiving means on the carriage. In this downward movement of the locking elements, it will be observed that the lowermost one of the flanges 102 and the upper end of the locking element will form a stop prohibiting further movement of the locking element 74 in its rectilinear path in a downward direction.

While there is shown and described the preferred embodiment of the invention, it is to be understood that the structure is susceptible to change and modification within the practicability of the invention and therefore should be limited only by the scope of the claims appended hereto.

What is claimed is:

1. For use with a trailer truck frame, a fifth wheel mounting comprising a horizontally disposed support frame including a pair of side frame members connected together in spaced relation by spaced cross pieces adapted to be superimposed upon the rear portion of the truck frame in a longitudinal direction, means for fixedly securing said support frame when in position upon the truck frame, a carriage superimposed upon and operatively connected to said support frame for longitudinal back and forth sliding movement thereon, means mounted on said carriage for attachment of a fifth wheel thereto and for movement with said carriage, said carriage having a locking element receiving means therein selectively regsterable with any one of a plurality of complemental locking element receiving means arranged in longitudinal spaced relation intermediate the side frame members of said frame and carried by said support frame in response to said sliding back anl forth movement of said carriage, and a locking element carried by said carriage for movement in a rectilinear path through said receiving means on said carriage and into engagement with the registered locking element receiving means on said support frame.

2. For use with a trailer truck frame, a fifth wheel mounting comprising a horizontally disposed support frame including a pair of side frame members connected together in spaced relation by spaced cross pieces adapted to be superimposed upon the rear portion of the truck frame in a longitudinal direction, means for fixedly securing said support frame when in position upon the truck frame, a carriage superimposed upon and operatively connected to said support frame for longitudinal back and forth sliding movement thereon, means mounted on said carriage for attachment of a fifth wheel thereto and for movement with said carriage, a fixed lock bar having a plurality of longitudinally spaced locking element receiving means therein positioned in longitudinal spaced relation intermediate the side frame members of said frame and carried by said support frame, said carriage having a locking element receiving means thereon selectively registerable with any one of said plurality of locking element receiving means in response to the sliding back and forth movement of said carriage, and a cooperating locking element carried on said carriage for rectilinear movement through said locking element receiving means on the carriage into engagement with the selected one of said receiving means in the fixed lock bar to secure the carriage in a selected position longitudinally of said support frame.

3. For use with a trailer truck frame, a fifth wheel mounting comprising a horizontally disposed support frame including a pair of side frame members connected together in spaced relation by spaced cross pieces adapted to be superimposed upon the rear portion of the truck frame in a longitudinal direction, means for fixedly securing said support frame when in position upon the truck frame, a carriage superimposed upon and operatively connected to said support frame for longitudinal back and forth sliding movement thereon, means mounted on said carriage for attachment of a fifth wheel thereto and for movement with said carriage, a fixed lock bar having a plurality of longitudinally spaced locking element receiving means therein positioned in longitudinal spaced relation intermediate the side frame members of said frame and carried by said support frame, said carriage having a locking element receiving means thereon selectively registerable with any one of said plurality of locking element receiving means in response to the sliding back and forth movement of said carriage, a cooperating locking element carried on said carriage for rectilinear movement through said locking element receiving means on the carriage into engagement with the selected one of said receiving means in the fixed lock bar to secure the carriage in a selected position longitudinally of said support frame, and mechanical means on said carriage operatively connected to said locking element to positively move the latter in its rectilinear path into and out of engagement with said receiving means in the lock bar.

4. For use with a trailer truck frame, a fifth wheel mounting comprising a horizontally disposed support frame including a pair of side frame members connected together in spaced relation by spaced cross pieces adapted to be superimposed upon the rear portion of the truck frame in a longitudinal direction, means for fixedly securing said support frame when in position upon the truck frame, a carriage superimposed upon and operatively connected to said support frame for longitudinal back and forth sliding movement thereon, means mounted on said carriage for attachment of a fifth wheel thereto and for movement with said carriage, a fixed lock bar having a plurality of longitudinally spaced locking element receiving means therein positioned in longitudinal spaced relation intermediate the side frame members of said frame and carried by said support frame, said carriage having a locking element receiving means thereon selectively registerable with any one of said plurality of locking element receiving means in response to the sliding back and forth movement of said carriage, a cooperating locking element carried on said carriage for rectilinear movement through said locking element receiving means on the carriage into engagement with the selected one of said receiving means in the fixed lock bar to secure the carriage in a selected position longitudinally of said support frame, and remotely operable hydraulic means carried on said carriage and operatively connected to said locking element for selectively moving said locking element in its rectilinear path into and out of engagement with said locking element receiving means in said lock bar.

References Cited in the file of this patent

UNITED STATES PATENTS

| | | |
|---|---|---|
| Re. 23,704 | DeHay | Sept. 1, 1953 |
| 2,317,508 | Zoder | Apr. 27, 1943 |
| 2,454,626 | Borzell | Nov. 23, 1948 |
| 2,697,614 | Smith | Dec. 21, 1954 |
| 2,713,500 | Flynn | July 19, 1955 |